United States Patent
Moyna et al.

(10) Patent No.: US 6,176,673 B1
(45) Date of Patent: Jan. 23, 2001

(54) TAILGATE ASSEMBLY HAVING SIDE MOUNTED HYDRAULIC CYLINDERS

(75) Inventors: John P. Moyna, Elkader, IA (US); Peter F. Prillinger, Dunlap, IL (US); Christopher Smith; David A. Young, both of Sunderland (GB)

(73) Assignee: Caterpillar Inc., Peoria, IL (US)

( * ) Notice: Under 35 U.S.C. 154(b), the term of this patent shall be extended for 0 days.

(21) Appl. No.: 09/160,946

(22) Filed: Sep. 25, 1998

(51) Int. Cl.[7] .................. B60P 1/00; B62D 33/02
(52) U.S. Cl. ................ 414/517; 296/57.1; 298/23 MD; 414/519
(58) Field of Search ................... 414/517, 519; 296/57.1; 298/23 MD, 23 R

(56) References Cited

U.S. PATENT DOCUMENTS

| | | |
|---|---|---|
| 1,485,632 | 3/1924 | Shea . |
| 1,927,653 | 9/1933 | Wehr ................................ 214/82 |
| 1,983,280 | 12/1934 | Flowers ............................ 298/23 |
| 2,047,602 | 7/1936 | Tomlinson ........................ 214/82 |
| 2,166,846 | 7/1939 | McCalley ......................... 214/67 |
| 2,179,726 | 11/1939 | Lewis et al. ..................... 214/82 |
| 2,463,987 | 3/1949 | Malone et al. ................... 298/1 |
| 2,653,846 | 9/1953 | Wiley .............................. 298/1 |
| 2,769,662 | 11/1956 | Schonrock ...................... 298/23 |
| 2,800,234 | 7/1957 | Herpich et al. .................. 214/82 |
| 2,876,918 | 3/1959 | Kling ............................... 214/82 |
| 3,273,728 | 9/1966 | Kelso .............................. 214/82 |
| 3,322,464 | 5/1967 | Merritt et al. ................... 298/23 |
| 3,672,520 | 6/1972 | Linville ........................... 214/82 |
| 3,768,672 | 10/1973 | Grooss ............................. 214/82 |
| 3,768,673 | 10/1973 | Nydam et al. .................. 214/83.24 |
| 3,815,764 | 6/1974 | Gilfillan et al. ................. 214/82 |
| 3,815,765 | 6/1974 | Moser et al. .................... 214/82 |
| 3,827,753 | 8/1974 | Pitts ................................ 298/1 B |
| 3,860,288 | 1/1975 | Martin et al. . |
| 3,881,764 | 5/1975 | Holland . |
| 3,896,947 | 7/1975 | Pearce ............................. 214/82 |
| 4,002,272 | 1/1977 | Crawford et al. .............. 222/392 |
| 4,041,625 | 8/1977 | Fisher et al. ................. 37/126 AE |
| 4,051,746 | 10/1977 | Liljeros ........................... 74/520 |
| 4,067,466 | 1/1978 | Parks et al. ..................... 214/82 |
| 4,071,153 | 1/1978 | Booher ............................ 214/82 |
| 4,516,904 | 5/1985 | Simmons ........................ 414/517 |
| 4,772,072 | * 9/1988 | Vick, Jr. ........................ 298/23 R X |
| 4,954,040 | 9/1990 | Smith et al. ................... 414/513 |
| 5,156,518 | 10/1992 | VanMatre ...................... 414/527 |
| 5,249,843 | 10/1993 | Hagenbuch et al. ........... 298/23 DF |
| 5,281,074 | 1/1994 | Mashuda ....................... 414/517 |
| 5,456,521 | 10/1995 | Moyna ........................... 298/1 B |
| 5,474,363 | 12/1995 | Hagenbuch .................... 298/23 R |
| 5,498,066 | 3/1996 | Cuthbertson et al. .......... 298/23 C |
| 5,518,287 | 5/1996 | Totani . |

FOREIGN PATENT DOCUMENTS

| | | |
|---|---|---|
| 0 410 917 A1 | 1/1991 | (EP) . |
| 2017043A | 2/1979 | (GB) . |
| 5058350 | 7/1993 | (JP) . |
| WO 96/21579 | 7/1996 | (WO) ........................ B60P/1/00 |

* cited by examiner

*Primary Examiner*—Steven A. Bratlie
(74) *Attorney, Agent, or Firm*—Maginot, Addison & Moore; John W. Morrison; James R. Smith

(57) ABSTRACT

A work machine having a receptacle adapted to receive and carry loads is disclosed. The receptacle has a first lateral sidewall, a second lateral sidewall spaced apart from the first lateral sidewall, and a floor extending between the first lateral sidewall and the second lateral sidewall. The work machine further includes a tailgate which extends transversely from the first sidewall to the second sidewall, the tailgate being pivotable between a closed position which prevents loads from exiting a rear portion of the receptacle, and an open position which allows loads to exit the rear portion of the receptacle. The work machine yet further includes a cylinder movable between a first rod position and a second rod position and a linkage. The linkage of the tailgate in the closed position when the cylinder is located in the first rod position, and positions the tailgate in the open position when the cylinder is located in the second rod position. The linkage includes a lever having a first lever end, a second lever end, and a fulcrum positioned between the first lever end and the second lever end. The lever is pivotally coupled to the first lateral sidewall. The first lever end is coupled to the tailgate. The second lever end is coupled to the cylinder.

15 Claims, 10 Drawing Sheets

(LEFT SIDE)

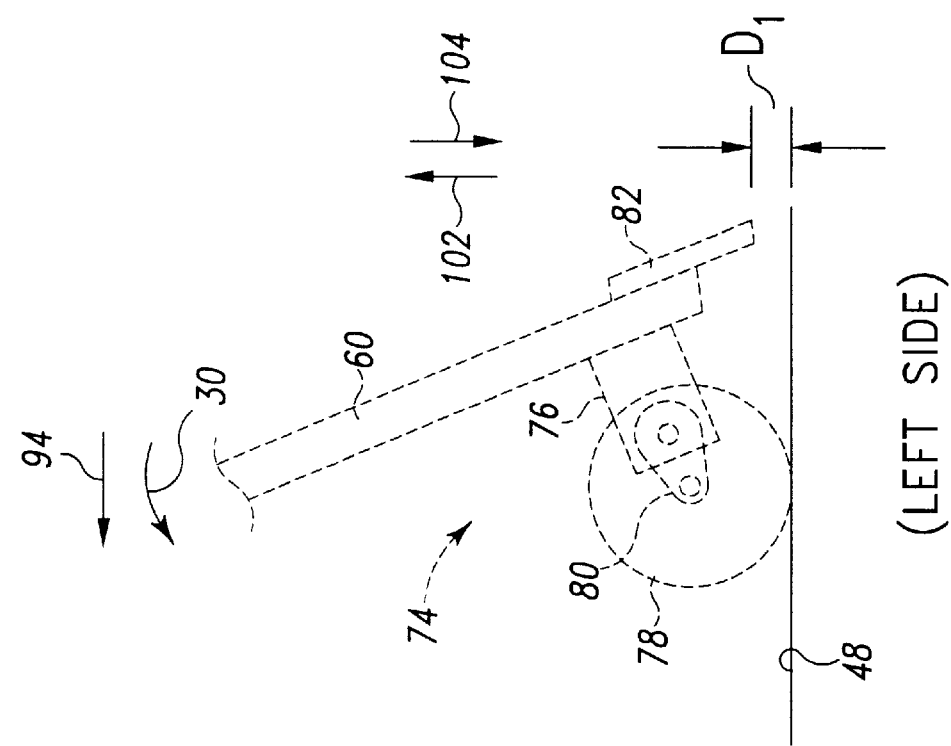
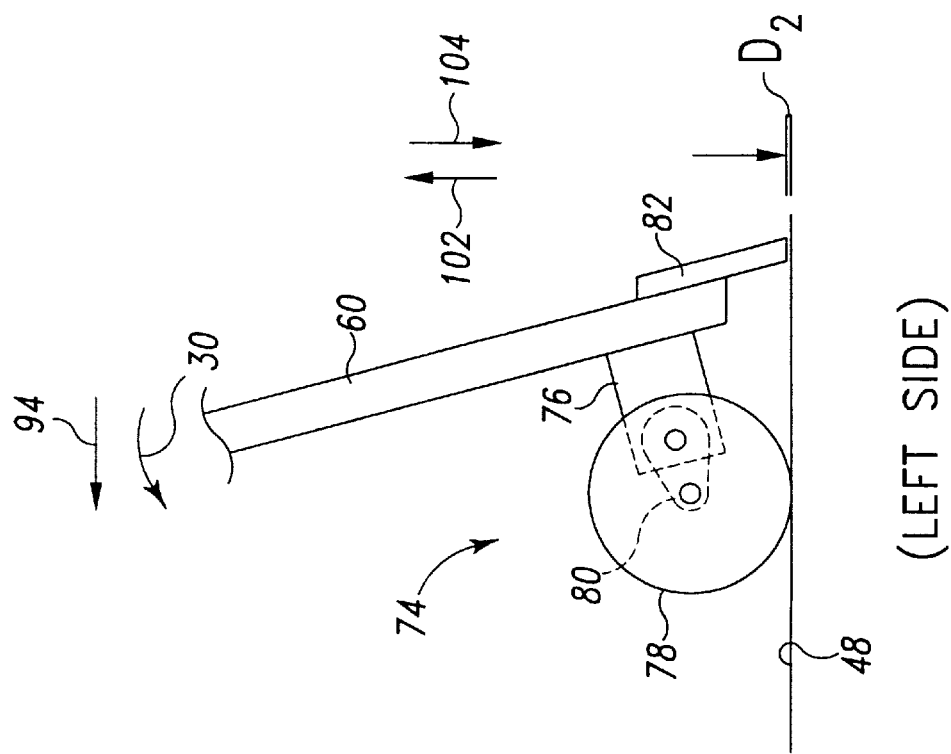

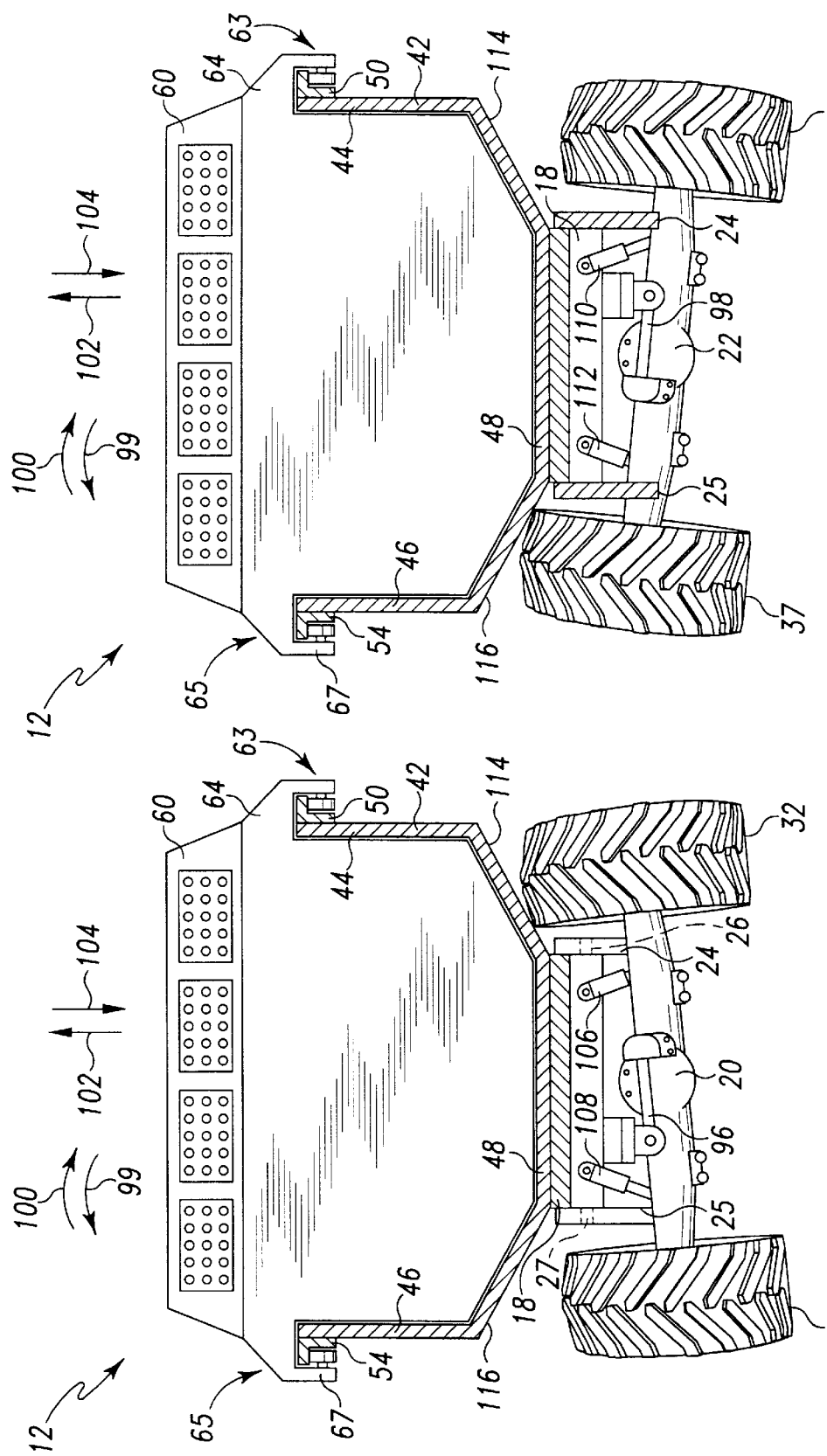

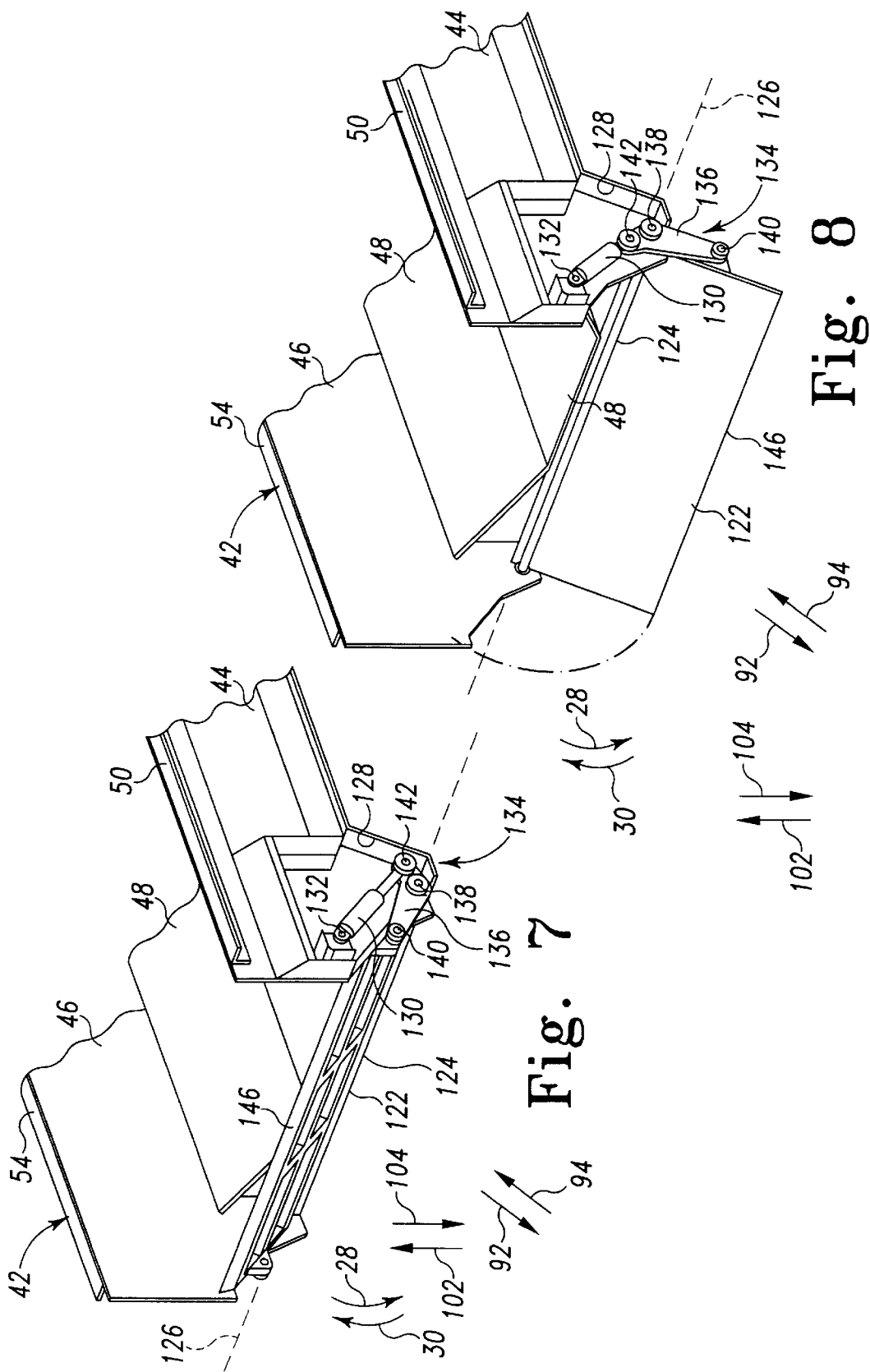

TAILGATE ASSEMBLY HAVING SIDE MOUNTED HYDRAULIC CYLINDERS

TECHNICAL FIELD OF THE INVENTION

The present invention relates generally to a tailgate assembly, and more specifically to a tailgate assembly having side mounted hydraulic cylinders.

BACKGROUND OF THE INVENTION

Work machines are used in earth moving operations to move material, such as dirt and rock, from one point to another. Conventional dump type work machines dump material by elevating a receptacle of the work machine with hydraulic cylinders. The force of gravity causes the material to be dumped out of the rear of the receptacle. There are several disadvantages to this type of work machine. First, elevating the receptacle of the work machine raises the center of gravity of the work machine making it less stable. Second, the raised receptacle can easily come into contact with overhead obstacles such as power lines or trees, which can limit the maneuverability of the work machine. Third, once the material begins to move in the receptacle, the material exits the receptacle quite rapidly, making it difficult for an operator of the work machine to spread the material evenly over a large area. In fact, a bulldozer is often employed to evenly distribute the material after it has been dumped from the work machine. Fourth, material, particularly dirt containing clay, can often stick to the receptacle of the work machine as the receptacle is elevated. The material stuck to the receptacle decreases the amount of material that can be moved by the work machine. In addition, an excavator or backhoe must be used to scrape the material from the receptacle, which can potentially damage the receptacle.

An ejector type work machine is an alternative to the conventional dump type work machine. Ejector type work machines do not elevate the receptacle to unload material. Instead, a hydraulic cylinder, or cylinders, urges an ejector plate between the front and the rear of the receptacle. As the ejector plate moves from the front to the rear of the receptacle, material is ejected out of the receptacle at a controlled rate. Because the receptacle is not raised, the center of gravity is not increased as the material is ejected. Therefore, the stability of the ejector type work machine is not decreased as the material is ejected. In addition, the receptacle is not raised so as to be exposed to overhead obstacles such as trees and power lines. Moreover, the rate that the material is ejected from the rear of the ejector type work machine can be controlled, making it possible to evenly distribute the material over a large area thereby reducing the need to employ a bulldozer to spread the material. Also, because the ejector plate tightly matches the shape of the receptacle, any material that sticks to the receptacle is scraped out of the receptacle during the ejection process thereby increasing the amount of dirt that can subsequently be loaded into the ejector type work machine.

The receptacle of the ejector type work machine includes a tailgate which prevents material from exiting the receptacle prior to the ejector plate pushing the material out of the rear of the receptacle. The tailgate is moved between a closed position which prevents material from exiting the receptacle and an open position which allows material to exit the receptacle by hydraulic cylinders. A drawback to tailgates that have heretofore been designed is that the hydraulic cylinders are mounted below the receptacle. Mounting the hydraulic cylinders below the receptacle exposes the hydraulic cylinders to the harsh environment of water, dust, mud, and other material that can be sprayed on the underside of the receptacle. In addition, there are situations where it would be advantageous to use the tailgate as a work tool to move material around. Mounting the cylinders below the receptacle prevents the tailgate from being used as a work tool because the cylinders could be damaged by the moving material with the tailgate.

What is needed therefore is a method and apparatus for mounting the tailgate cylinders on the ejector type work machine which overcomes one or more of the above-mentioned drawbacks.

BRIEF DESCRIPTION OF THE DRAWINGS

FIG. 3A is an enlarged view of the lower portion of the ejector plate of FIG. 3 positioned in the extended position;

FIG. 3B is an enlarged view of the lower portion of the ejector plate of FIG. 3 positioned in the retracted position;

FIG. 5 is cross sectional view of the trailer assembly taken along the line 5—5 of FIG. 4 as viewed in the direction of the arrows, note that the tires are not shown in cross section for clarity of description;

FIG. 6 is cross sectional view of the trailer assembly taken along the line 6—6 of FIG. 4 as viewed in the direction of the arrows, note that the tires are not shown in cross section for clarity of description;

FIG. 7 is a fragmentary perspective view of a rear portion of the work machine of FIG. 1 showing a tailgate in the closed position;

FIG. 8 is a view similar to FIG. 7, but showing the tailgate in the open position;

DISCLOSURE OF THE INVENTION

Figure 1:
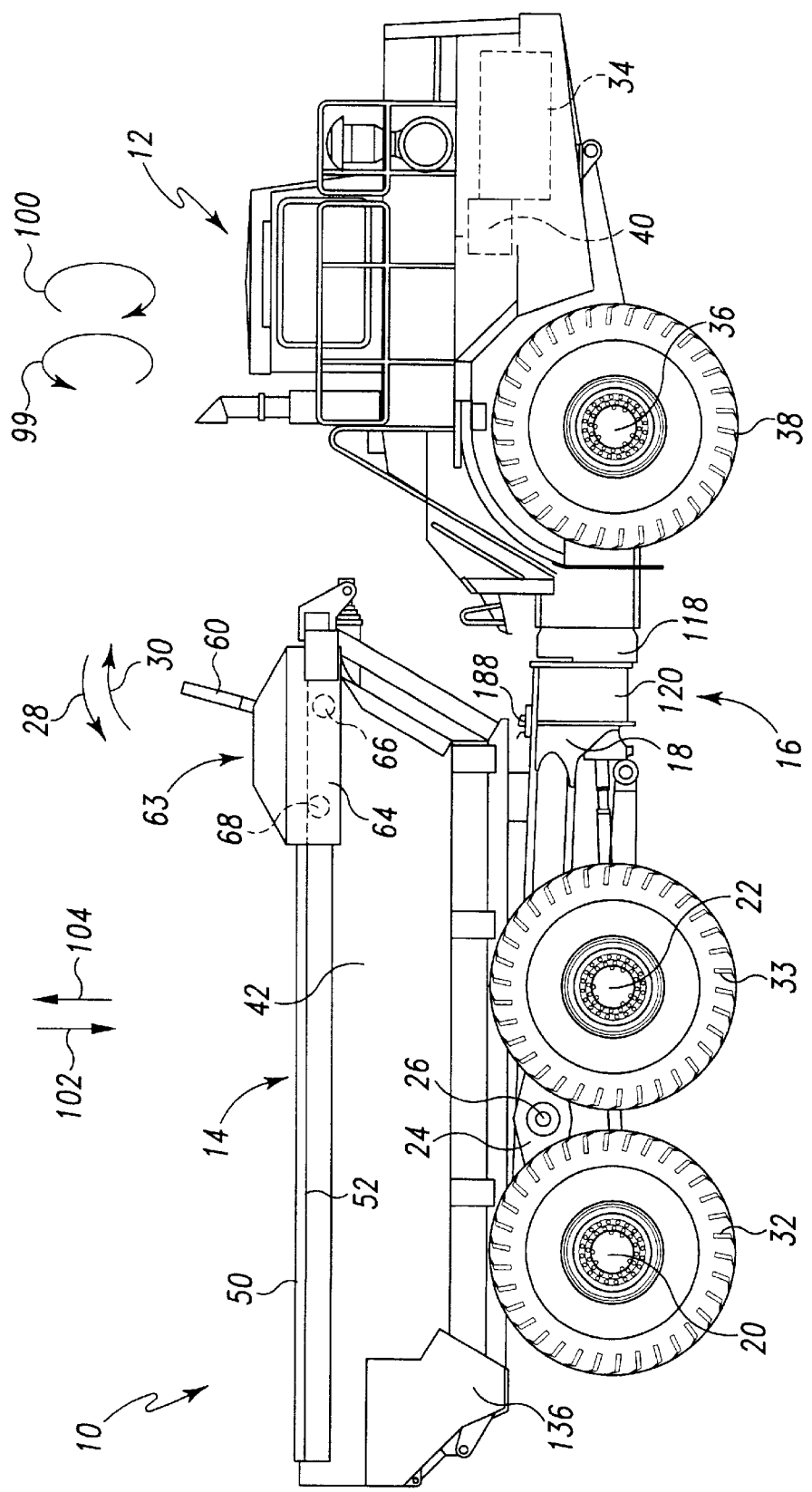
FIG. 1 is a right elevational view of the work machine 10 which incorporates the features of the present invention therein.

In accordance with a first embodiment of the present invention, there is provided a work machine having a receptacle adapted to receive and carry loads. The work machine includes a first lateral sidewall, a second lateral sidewall spaced apart from the first lateral sidewall, and a floor extending between the first lateral sidewall and the second lateral sidewall. The first lateral sidewall has a first cylinder recess defined therein. The work machine further includes a tailgate which extends transversely from the first sidewall to the second sidewall. The tailgate is movable between a closed position which prevents loads from exiting a rear portion of the receptacle, and an open position which allows loads to exit the rear portion of the receptacle. The work machine yet further includes a cylinder positioned within the first cylinder recess and movable between a first rod position and a second rod position. The work still further includes a linkage positioned within the first cylinder recess. The linkage operatively couples the cylinder to the tailgate. The linkage positions the tailgate in the closed position when the cylinder is in the first rod position. The linkage positions the tailgate in the open position when the cylinder is in the second rod position. The work machine yet further includes a protective cover positioned over the first cylinder recess and secured to the first lateral sidewall.

In accordance with a second embodiment of the present invention, there is provided a work machine having a receptacle adapted to receive and carry loads. The receptacle has a first lateral sidewall, a second lateral sidewall spaced apart from the first lateral sidewall, and a floor extending between the first lateral sidewall and the second lateral sidewall. The work machine further includes a tailgate which extends transversely from the first sidewall to the second sidewall, the tailgate being pivotable between a closed position which prevents loads from exiting a rear portion of the receptacle, and an open position which allows loads to exit the rear portion of the receptacle. The work machine yet further includes a cylinder movable between a first rod position and a second rod position and a linkage. The linkage positions the tailgate in the closed position when the cylinder is located in the first rod position, and positions the tailgate in the open position when the cylinder is located in the second rod position. The linkage includes a lever having a first lever end, a second lever end, and a fulcrum positioned between the first lever end and the second lever end. The lever is pivotally coupled to the first lateral sidewall. The first lever end is coupled to the tailgate. The second lever end is coupled to the cylinder.

In accordance with a third embodiment of the present invention, there is provided a work machine having a receptacle adapted to receive and carry loads. The work machine has a first lateral sidewall, a second lateral sidewall spaced apart from the first lateral sidewall, and a floor extending between the first lateral sidewall and the second lateral sidewall. The work machine further includes a tailgate which extends transversely from the first sidewall to the second sidewall. The tailgate being pivotable around a tailgate axis between a closed position which prevents loads from exiting a rear portion of the receptacle, and an open position which allows loads to exit the rear portion of the receptacle. The work machine yet further includes a cylinder positioned within the first cylinder recess and movable between a first rod position and a second rod position. The work machine still further includes a lever which positions the tailgate in the closed position when the cylinder is located in the first rod position, and positions the tailgate in the open position when the cylinder is located in the second rod position. The lever has a first lever end, a second lever end, and a fulcrum positioned between the first lever end and the second lever end. The lever is pivotally coupled to the first lateral sidewall. The first lever end is coupled to the tailgate. The second lever end is coupled to the cylinder. The fulcrum is aligned with the tailgate axis.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1 there is shown a work machine 10 that incorporates the features of the present invention therein. The work machine 10 includes a cab assembly 12 and a trailer assembly 14. The cab assembly 12 is pivotably coupled to the trailer assembly 14 by a hitch and collar assembly 16 which allows the cab assembly 12 to rotate and twist in relation to the cab trailer assembly 14.

The trailer assembly 14 includes a frame 18, a first axle 20, a second axle 22, a right suspension member 24, and a left suspension member 25 (shown in FIG. 5). The frame 18 spans the length of the trailer assembly 14 and provides a structure for mounting other components of the trailer assembly 14 thereon. The right suspension member 24 is pivotably mounted to the frame 18 by a pin 26 such that the right suspension member 24 can rotate about the pin 26 in the general direction of arrows 28 and 30. In a similar manner, the left suspension member 25 is pivotably mounted to the frame 18 by a pin 27 (see FIG. 5) such that the left suspension member 25 can rotate about frame 18 in the general direction of arrows 28 and 30. A right end of first axle 20 is operatively coupled to the rear end of the right suspension member 26 and the left end of the first axle 20 is operatively coupled to the rear end of the left suspension member 25. Similarly, a right end of second axle 22 is operatively coupled to the front end of the right suspension member 24 and the left end of the second axle 22 is operatively coupled to the front end of the left suspension member 25. A first right tire 32 is mounted to the right end of the first rear axle 20 whereas a second right tire 33 is mounted to the right end of the second axle 22. Similarly, a first left tire 35 is mounted to the left end of the first axle 20 whereas a second left tire 37 is mounted to the left end of the second axle 22 (see FIG. 4).

The cab assembly 12 includes a front axle 36 and a pair of tires 38 which support the cab assembly 12. The cab assembly 12 further includes an engine 34. In the exemplary embodiment, the engine 34 is a diesel engine. Diesel engines have several advantages including high torque output, reliability, and low fuel cost. A transmission (not shown) splits the power output of the engine 34 between a front axle 36, the first axle 20, and the second axle 22. Moreover, the transmission allows the operator to selectively change the gear ratios between the engine 34 and the front axle 34, the first shaft 20, and the second axle 22. The change of ratios allows the work machine to provide torque to the tires 32, 33, 35, 37, 38 over a broad range of operating conditions. In particular, high torque may be required at low speeds whereas low torque may be required at high speeds.

The cab assembly 12 further includes a hydraulic pump 40 coupled to the engine 34. In particular, the hydraulic pump 40 uses mechanical energy from the engine 34 to raise hydraulic oil to an operational pressure. The operational pressure is supplied to a various hydraulic systems of the work machine 10.

The trailer assembly 14 further includes a receptacle 56 adapted to receive and carry loads. In earth moving operations, the most common loads are dirt, rock, dirt gravel, and other similar material. The work machine 10 shown in FIG. 1 is configured to carry loads for earth moving operations.

Overhead Rail Configuration

Figure 2:
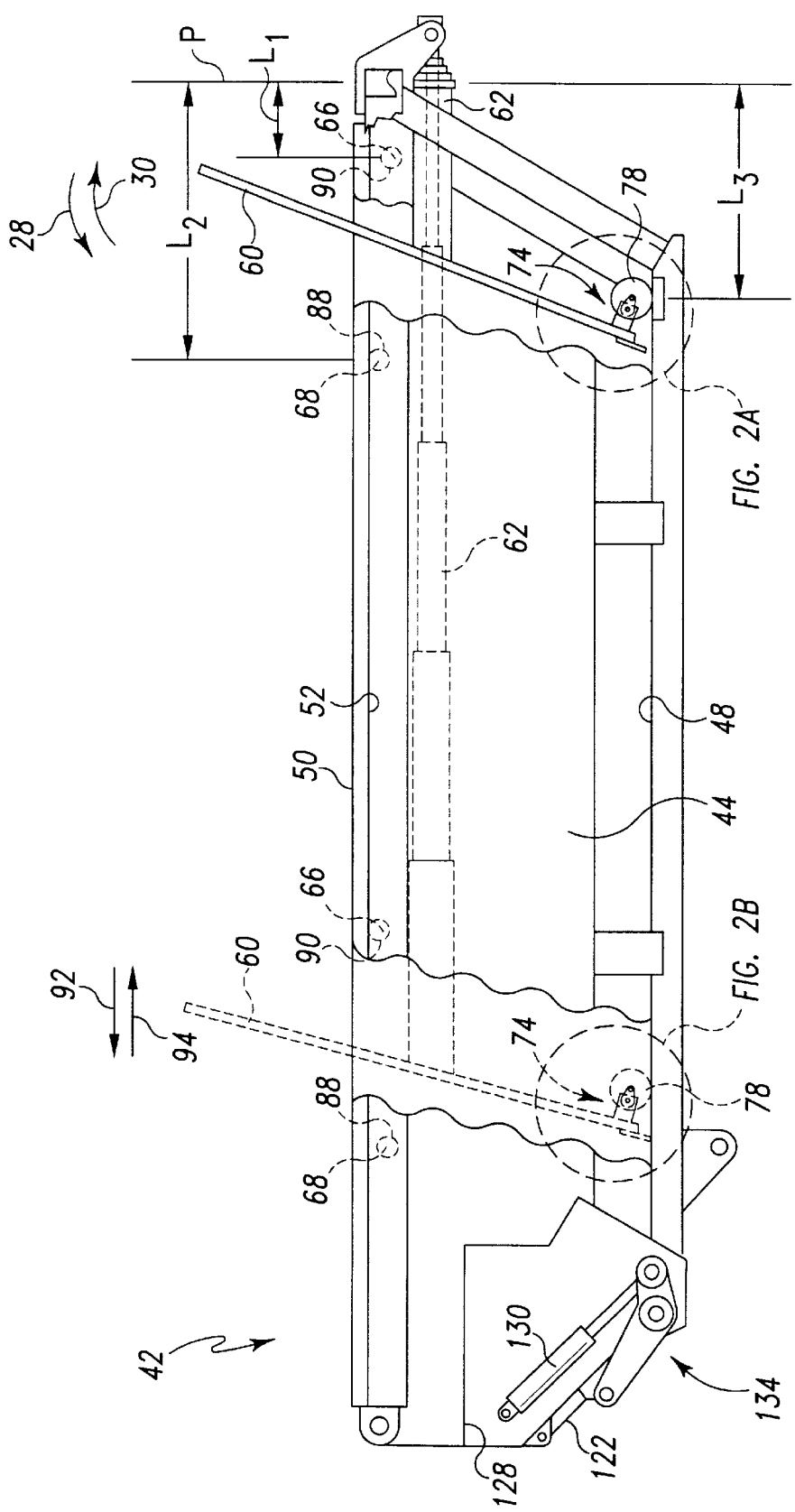
FIG. 2 is a partial cutaway view of the right side of the receptacle of the work machine of FIG. 1, note that the right guide member has been removed for clarity of description and the ejector plate is shown in phantom in an extended position.
Figure 3:
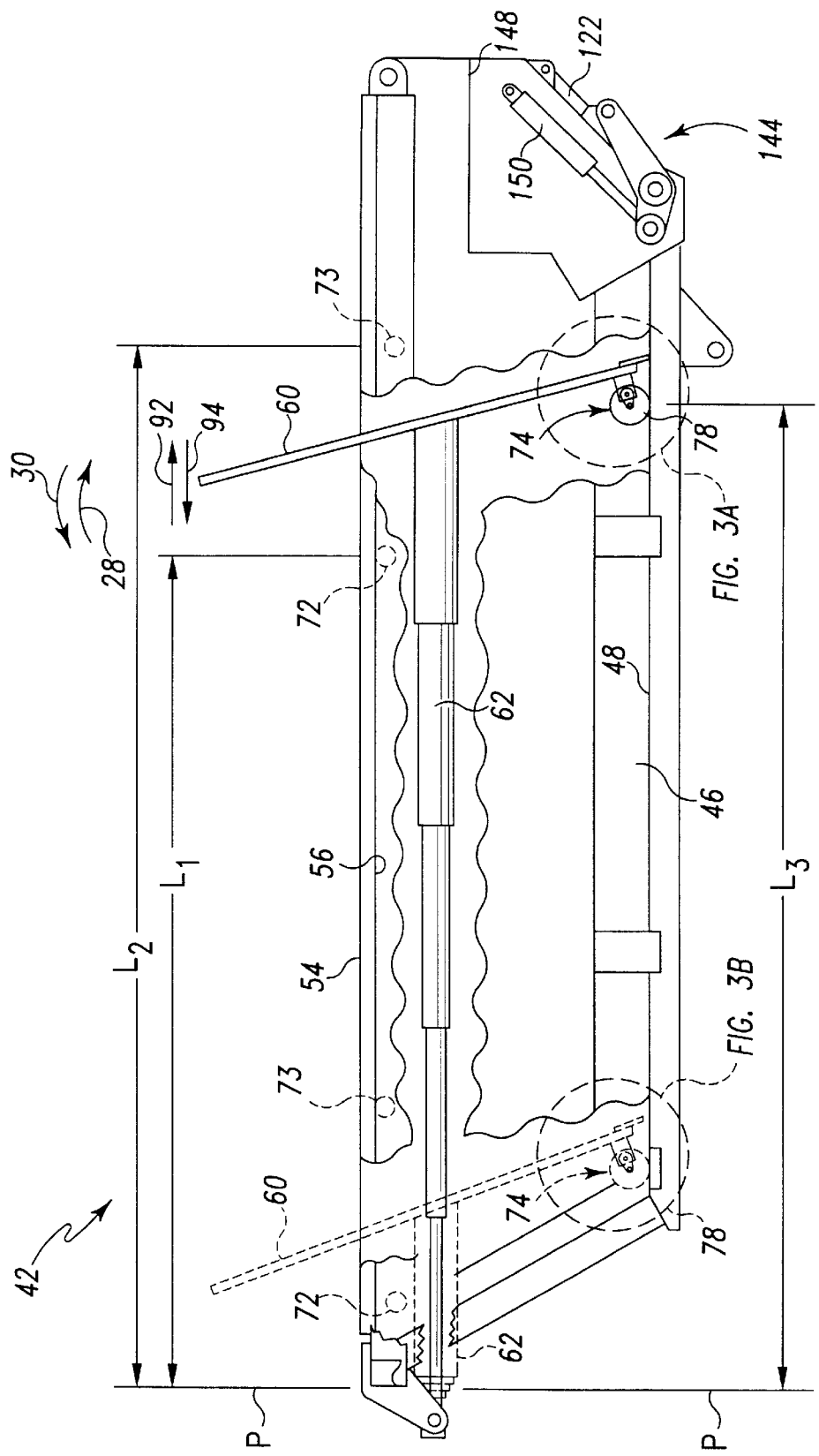
FIG. 3 is a partial cutaway view of the left side of the receptacle of the work machine of FIG. 1, note that the left guide member has been removed for clarity of description and the ejector plate is shown in phantom in the retracted position.

Referring now to FIGS. 2 and 3, there is shown the receptacle 42 in greater detail. The receptacle 42 includes a first lateral side wall 44 spaced apart from a second lateral sidewall 46 and joined by a floor 48 (shown in FIGS. 5 and 6). A first rail 50 extends along an upper portion of the first lateral sidewall 44 and defines a first lower rail surface 52 (shown in FIG. 2). The first rail 50 extends outwardly from the right lateral sidewall 44 (see FIGS. 5 and 6). Similarly, a second rail 54 extends along an upper portion of the second lateral sidewall 46 and defines a first lower rail surface 56 (shown in FIG. 3). The second rail 54 extends outwardly from the left lateral sidewall 44 (see FIGS. 5 and 6).

An ejector plate 60 spans the distance between the first lateral sidewall 44 and the second lateral sidewall 46 and extends from the floor 48 past the first rail 50 and the second rail 54. The ejector plate 60 is movable from retracted position (shown in solid in FIG. 2) to an extended position (shown in phantom in FIG. 2). A multistage hydraulic cylinder 62 is interposed between the receptacle 42 and the ejector plate 60. The multistage hydraulic cylinder 62 is operative to move the ejector plate 60 from the retracted position to the extended position and to return the ejector plate from the extended position to the retracted position.

This configuration of the ejector plate 60 is similar to an ejector plate disclosed in a co-pending patent application Ser. No. 08/936,280 invented by Moyna, which in entitled "Side Rail Ejecting Device", and which is hereby incorporated by reference, and which is assigned to the same assignee as the present invention.

A first guide assembly 63 supports the right side of the ejector plate 60 (see FIGS. 5 and 6). A first guide member 64 is secured to the upper right portion of the ejector plate 60 (see FIGS. 1, 5 and 6. Note, that the first guide member 64 has be removed from FIG. 2 for clarity of description). A first leading roller 66 is rotatably secured to the first guide assembly 64 ahead of the ejector plate 60 and a first trailing roller 68 is rotatably secured to the first guide assembly 64 aft of the ejector plate 60.

A second guide assembly 65 supports the right side of the ejector plate 60 (see FIGS. 5 and 6). A second guide member 67 is secured to the upper left portion of the ejector plate 60 (see FIGS. 5 and 6.) Note, that the second guide member 67 has be removed from FIG. 3 for clarity of description). A second leading roller 72 is rotatably secured to the second guide member 67 ahead of the ejector plate 60 and a second trailing roller 73 is rotatably secured to the second guide member 67 aft of the ejector plate 60.

A vertical plane P is defined by a front end of the receptacle 42. A first length $L_1$ is defined by a horizontal distance between the plane P and the first leading roller 66 or the second leading roller 72. A second length $L_2$ is defined by a horizontal distance between the plane P and the first trailing roller 68 or the second trailing roller 73. A third length $L_3$ is defined by a horizontal distance between the plane P and the support roller 78. Note, FIG. 2 shows the first length $L_1$, second length $L_2$, and third length $L_3$ at a first time when the ejector plate 60 is positioned in the retracted position. On the other hand, FIG. 3 shows the first length $L_1$, second length $L_2$, and third length $L_3$ at a second time when the ejector plate 60 is positioned in the extended position. For each position of the ejector plate 60, the length $L_1$ is less than the length $L_3$ and the length $L_3$ is less than the length $L_2$.

Figure 2A:
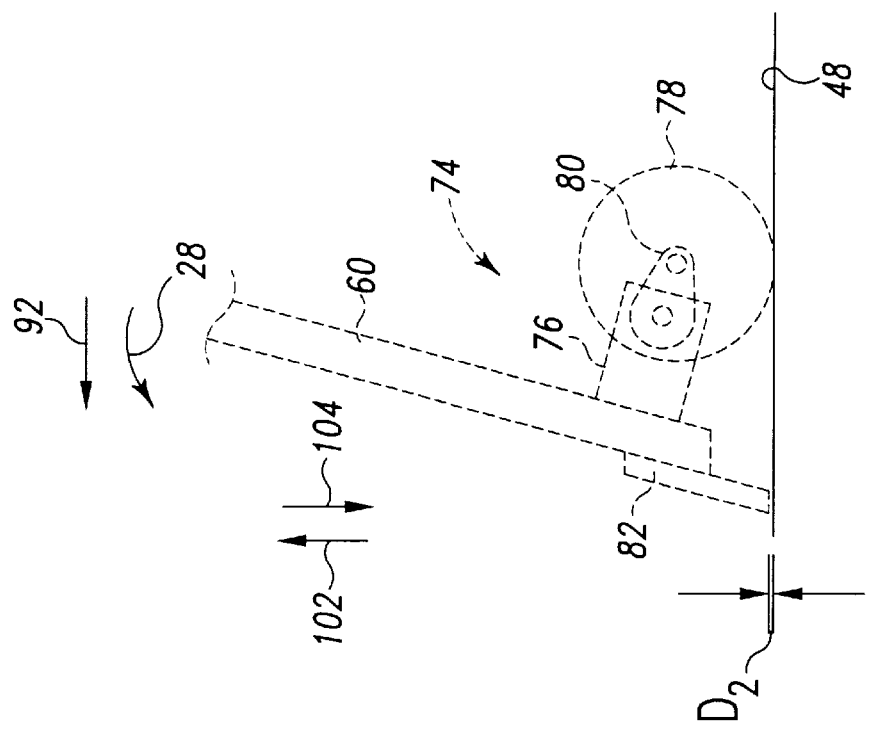
FIG. 2A is an enlarged view of the lower portion of the ejector plate of FIG. 2 positioned in a retracted position.
Figure 2B:
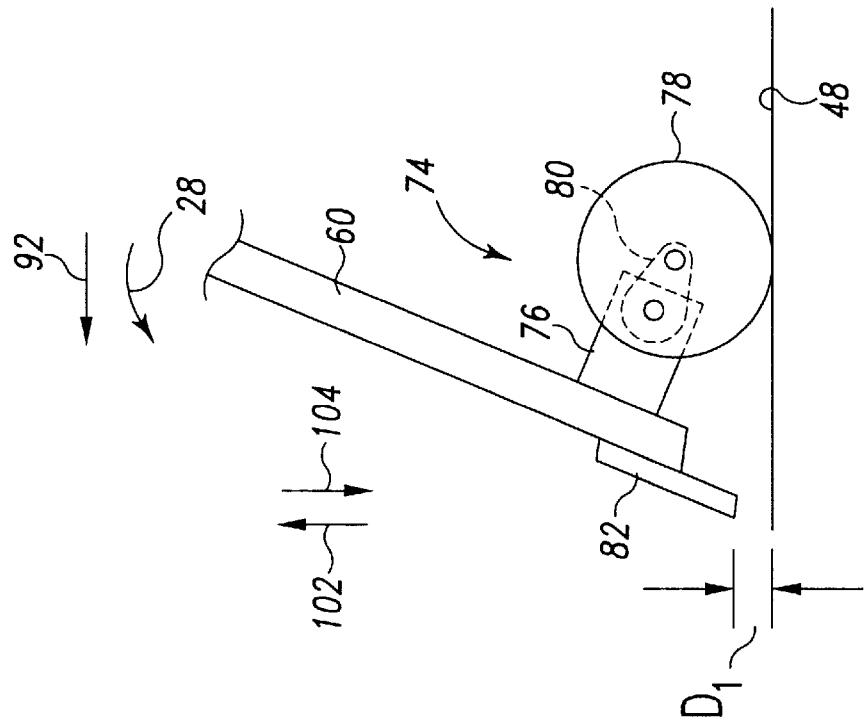
FIG. 2B is an enlarged view of the lower portion of the ejector plate of FIG. 2 positioned in the extended position.

Referring now to FIGS. 2A and 2B, a support assembly 74 supports the weight of the ejector plate 60 on the floor 48 of the receptacle 42. The support assembly 74 includes a support member 76 and a support roller 78 rotatably secured to the support member 76. An adjustable cam 80 is interposed between the support member 76 and the roller and is operable to change the relative position between the ejector plate 60 and the support roller 78. In particular, when the ejector plate 60 is positioned as shown in FIG. 2A, a gap having a size $D_1$ exists between the lower portion 82 of the ejector plate 60 and the floor 48 of the receptacle 42. If it is desired to increase the size $D_1$ of the gap, then the adjustable cam 80 is rotated in the general direction of arrow 30 so as to urge the ejector plate 60 in the general direction of arrow 102 with respect to the floor 48. On the other hand, if it is desired to decrease the size $D_1$ of the gap, then the adjustable cam 80 is rotated in the general direction of arrow 28 so as to allow the ejector plate 60 to advance in the general direction of arrow 104 with respect to the floor 48.

When the ejector plate is in the retracted position (shown in solid in FIG. 2 and shown in phantom in FIG. 3), the ejector plate 60 is supported by the support roller 78, the first trailing roller 68 and the second trailing roller 73. In particular, a first peripheral support surface 88 of the first trailing roller 68 is in rolling contact with the first lower rail surface 52 of the first rail 50. The second trailing roller 73 is in similar contact with the second lower rail surface of the second rail 54 (shown in FIG. 3). Additionally, the first leading roller 66 is spaced apart from the first lower rail surface 52 of the first rail 50. In particular, the second peripheral support surface 90 of the first leading roller 66 is free from contact with any component of the work machine. The second trailing roller 73 is similarly free from contact with the second lower rail surface 56 of the second rail 54 (shown in FIG. 3).

Referring now to FIG. 2, to move the ejector plate 60 from the retracted position, shown in solid in FIG. 2, to the extended position, shown in phantom in FIG. 2, the multistage cylinder 62 must be extended in the general direction of arrow 92. The force of the multistage cylinder 62 acting on the ejector plate 60 in the general direction of arrow 92 causes the ejector plate 60 to rotate about the support roller 78 in the general direction of arrow 28. As the ejector plate 60 is rotated in the general direction of arrow 28, the first leading roller 66 comes into contact with the first lower surface 52 of the first rail 50. In particular, the second peripheral support surface 90 of the first leading roller 66 is placed into contact with the first lower rail surface 52 of the first rail 50. In a similar manner, the second leading roller 72 comes into contact with the second lower surface 56 of the second rail 54.

It should be appreciated that as the ejector plate 60 rotates in the general direction of arrow 28, the third length $L_3$ is always greater than the first length $L_1$. This configuration of the first leading roller 66 relative to the support roller 78 limits the rotation of the ejector plate 60 in the general direction of arrow 28 as a result of the first leading roller 66 contacting the first lower surface 52 of the first rail 50. If the third length $L_3$ were less than the first length $L_1$, the support roller 78 would move in the general direction of arrow 94 allowing the ejector plate 60 to continue to rotate in the general direction of arrow 28 after the first leading roller 66 is placed into contact with the first lower surface 52 of the first rail 50.

It should further be appreciated that as the ejector plate 60 is rotated in the general direction of arrow 28, the first trailing roller 68 is rotated out of contact with the with the first lower surface 52. In particular, the first peripheral support surface 88 of the first trailing roller 68 is free from contact with any component of the work machine 10. In a similar manner, the second trailing roller 73 is moved out of contact with the second lower surface 56 of the second rail 54. As a result of the rotation of the ejector plate 60 in the general direction of arrow 28 the gap between the floor 48 and the lower portion 82 of the ejector plate 60 is reduced in size from $D_1$ (shown in FIG. 2A) to $D_2$ (shown in FIG. 2B). Subsequent extension of the multistage cylinder 62 moves the ejector plate in the general direction of arrow 92.

Referring now to FIG. 3, to move the ejector plate 60 from the extended position, shown in solid in FIG. 3, to the retracted position, shown in phantom in FIG. 3, the multistage cylinder 62 must be retracted in the general direction of arrow 94. The force of the multistage cylinder 62 acting on the ejector plate 60 in the general direction of arrow 94 causes the ejector plate 60 to rotate about the support roller 78 in the general direction of arrow 30. As the ejector plate 60 is rotated in the general direction of arrow 30, the first trailing roller 68 comes into contact with the first lower surface 52 of the first rail 50 (shown in phantom in FIG. 2). In particular, the first peripheral support surface 88 of the first trailing roller 68 is placed into contact with the first lower rail surface 52 of the first rail 50. In a similar manner, the second trailing roller 73 comes into contact with the second lower surface 56 of the second rail 54.

It should be appreciated that as the ejector plate 60 rotates in the general direction of arrow 30, the third length $L_3$ is always less than the second length $L_2$. This configuration of the second trailing roller 73 relative to the support roller 78 limits the rotation of the ejector plate 60 in the general direction of arrow 30 as a result of the second trailing roller 73 contacting the second lower surface 56 of the second rail 54. If the third length $L_3$ were greater than the second length $L_2$, the support roller 78 would move in the general direction of arrow 92 allowing the ejector plate 60 to continue to rotate in the general direction of arrow 30 after the second trailing roller 73 is placed into contact with the second lower surface 56 of the second rail 54.

It should further be appreciated that as the ejector plate 60 is rotated in the general direction of arrow 30, the first leading roller 66 is rotated out of contact with the with the first lower surface 52 (see FIG. 2). In particular, the second peripheral support surface 90 of the first leading roller 66 is free from contact with any component of the work machine 10. In a similar manner, the second leading roller 72 is moved out of contact with the second lower surface 56 of the second rail 54. As a result of the rotation of the ejector plate 60 in the general direction of arrow 30 the gap between the floor 48 and the lower portion 82 of the ejector plate 60 is increased in size from $D_2$ (shown in FIG. 3A) $D_1$ to (shown in FIG. 3B). Subsequent retraction of the multistage cylinder 62 moves the ejector plate in the general direction of arrow 94.

Decreasing the size of the gap from $D_1$ to $D_2$ when the ejector plate 60 moves from the retracted to the extended position and increasing the size of the gap $D_2$ to $D_1$ when the ejector plate 60 moves from the extended to the retracted position is a significant advantage of the present invention. In particular, as the ejector plate moves from the retracted position to the extended position, the gap size $D_2$ (shown in FIG. 2B) is so small that a material, such as dirt or rock, is scraped off the floor 48 and out of the receptacle 42 in the direction of arrow 92. As the ejector plate moves from the extended position to the retracted position in the general direction of arrow 94, the gap size $D_1$ (shown in FIG. 3A) is large enough to bypass any material that may inadvertently remain on the floor 48 of the receptacle 42 so as to require significantly less force to retract the multistage cylinder 62. Because the multistage cylinder 62 has a disadvantage of producing significantly less force when being retracted as compared to being extended, the rotation of the ejector plate assures that the multistage cylinder 62 can always be retracted in the general direction of arrow 94 because the floor 48 of the receptacle 42 was scraped substantially clean as the ejector plate 60 moved in the general direction of arrow 92.

The first rail 50 and the second rail 54 have significant advantages over rails heretofore used with ejector plates. The rollers 66, 68, 72, and 73 only contact the respective lower rail surfaces 52 and 56. Because the receptacle 42 is generally loaded from above, dirt and other material generally collects on an upper surface of the rail and impairs any movement of rollers along the upper surface. By moving the point of contact between the rollers 66, 68, 72 and 73 to the lower surfaces 52 and 56, material is less likely to impair the movement of the rollers 66, 68, 72, or 73. In addition, the force of gravity assists in removing any accumulation of material along the lower rail surfaces 52, 56 when a respective roller 66, 68, 72, or 73 passes over the material. Thus, by configuring the rails 50, 54 such that the respective rollers 66, 68, 72 and 73 only contact the lower rail surfaces 52 or 56, the accumulation of material on the rails 50, 54 is reduced, and the rollers 66, 68, 72, 73 act in conjunction with gravity to remove the reduced amount of material on the rails 50, 54.

Increased Stability Configuration

Figure 4:
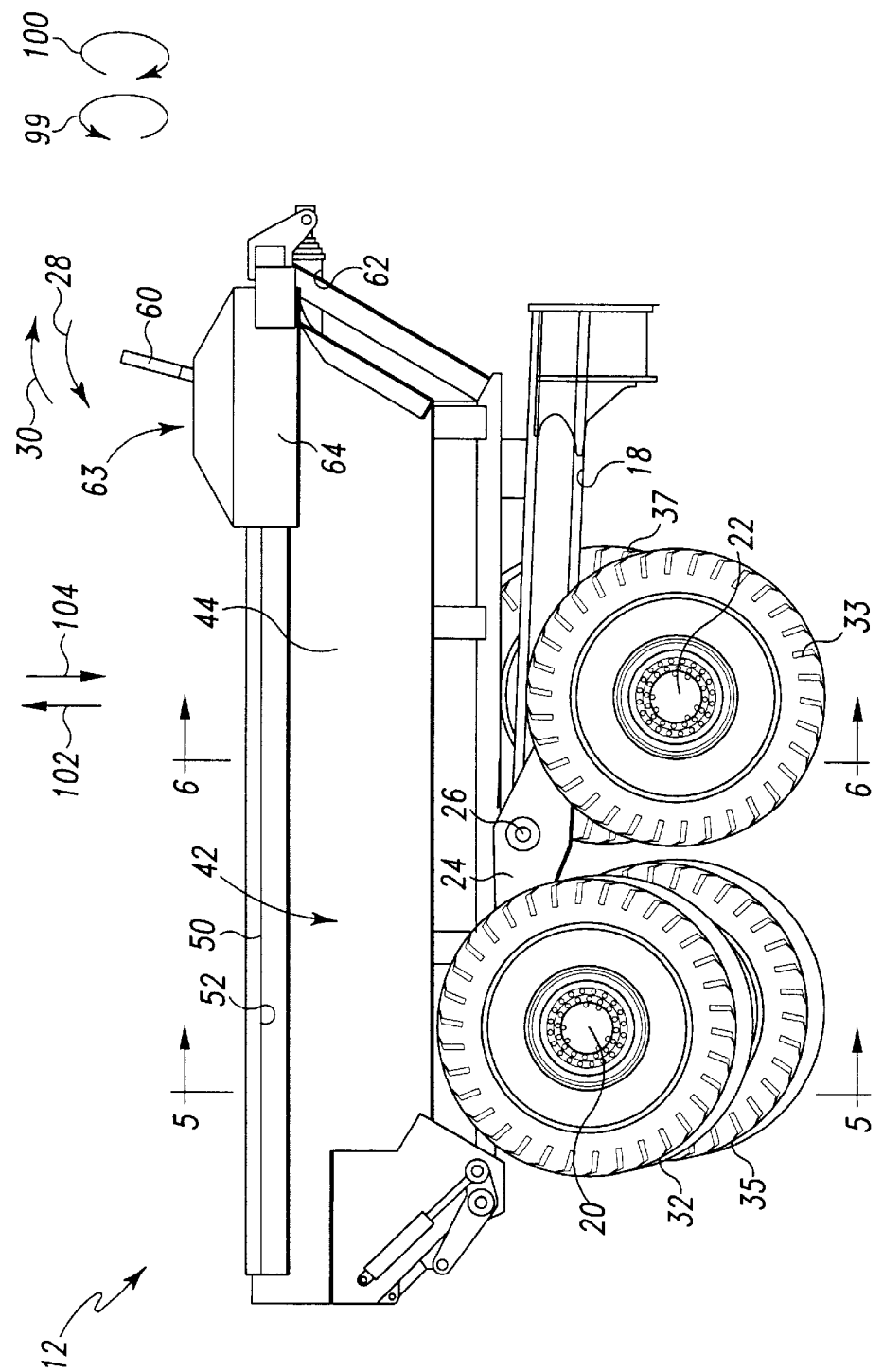
FIG. 4 is a right elevational view of a trailer assembly of the work machine of FIG. 1 showing a first axle and a second axle rotated with respect to a frame of the trailer assembly.

Referring now to FIGS. 4, 5, and 6, there is shown the trailer assembly 12 with the axles 20 and 22 rotated relative to the frame 18. In particular, the first axle 20 is pivotally coupled to the frame 18 by a first linkage 96 such that the first axle 20 is free to rotate in the general direction of arrows 99 and 100 relative to the frame 18 (see FIG. 5). Similarly, the second axle 22 is pivotally coupled to the frame 18 by a second linkage 98 such that the first axle 20 is free to rotate in the general direction of arrows 99 and 100 relative to the frame 18 (see FIG. 6).

The right suspension member 24 couples the right side of the first axle 20 to the right side of the second axle 22 such that when the first right tire 32 urges the first axle 20 upward in the general direction of arrow 102, the right suspension member 24 is rotated in the general direction of arrow 30 of FIG. 4, which in turn urges the right end of the second axle 22 and the second right tire 32 downward in the general direction of arrow 104. Similarly, the left suspension member 25 couples the left side of the first axle 20 to the left side of the second axle 22 such that when the first left tire 35 urges the first axle 20 downward in the general direction of arrow 104, the left suspension member 25 is rotated in the general direction of arrow 28, which in turn urges the right end of the second axle 22 and the second right tire 37 upward in the general direction of arrow 102. Thus, as the first right tire 32 and second left tire 37 are moved upward, the second right tire 33 and the first left tire 35 are moved downward (see FIG. 4). In addition, as the first right tire 32 and second left tire 37 are moved downward, the second right tire 33 and the first left tire 35 are moved upward (not shown).

To dampen the movement of the right side of the first axle 20 a first right shock absorber 106 is interposed between the frame 18 and the right side of the first axle 20. The first right shock absorber 106 is movable between a first right fully compressed position (shown in FIG. 5) and a first right fully extended position (not shown). To dampen the movement of the left side of first axle 20 a first left shock absorber 108 is interposed between the frame 18 and the left side of the first axle 20. The first left shock absorber 108 is movable between a first left fully compressed position (not shown) and a first left fully extended position (shown in FIG. 5).

To dampen the movement of the right side of the second axle 22 a second right shock absorber 110 is interposed between the frame 18 and the right side of the second axle 22. The second right shock absorber 110 is movable between a second right fully compressed position (not shown) and a second right fully extended position (shown in FIG. 6). To dampen the movement of the left side of the second axle 22 a second left shock absorber 112 is interposed between the frame 18 and the left side of the second axle 22. The second left shock absorber 112 is movable between a second left fully compressed position (shown in FIG. 6) and a second left fully extended position (not shown).

To enhance the stability of the work machine 10, the frame 18, the receptacle 42, the first axle 20, and the first right tire 32, and the first right shock absorber 106 are mounted in relation to each other such that when the frame 18 tilts to the right, i.e. in the general direction of arrow 100, relative to the first axle 20, the first right tire 32 comes into contact with a right lateral ledge 114 positioned above the first right tire 32 and the second right tire 33. It should be appreciated that the work machine 10 is configured such that the first right tire 32 contacts the right lateral ledge 114 when the first right shock absorber 106 is positioned between the first right fully compressed position and the first right fully extended position.

Similarly, the frame 18, the receptacle 42, the first axle 20, the first left tire 33, and the first left shock absorber 108 are mounted in relation to each other such that when the frame 18 tilts to the left, i.e. in the general direction of arrow 99, relative to the first axle 20, the first left tire 35 comes into contact with a left lateral ledge 116 positioned above the first left tire 35 and the second left tire 37. It should be appreciated that the work machine 10 is configured such that the first left tire 33 contacts the left lateral ledge 116 when the first left shock absorber 108 is positioned between the first left fully compressed position and the first left fully extended position.

In addition, the frame 18, the receptacle 42, the second axle 22, the second right tire 33, and the second right shock absorber 110 are mounted in relation to each other such that when the frame 18 tilts to the right, i.e. in the general direction of arrow 100, relative to the second axle 20, the second right tire 33 comes into contact with the right lateral ledge 114 of the receptacle 42 (not shown). It should be appreciated that the work machine 10 is configured such that the second right tire 33 contacts the right lateral ledge 114 when the second right shock absorber 110 is positioned between the second right fully compressed position and the second right fully extended position.

Similarly, the frame 18, the receptacle 42, the second axle 22, the second left tire 37, and the second left shock absorber 112 are mounted in relation to each other such that when the frame 18 tilts to the left, i.e. in the general direction of arrow 99, relative to the second axle 22, the second left tire 37 comes into contact with the left lateral ledge 116 of the receptacle 42 as shown in FIG. 6. It should be appreciated that the work machine 10 is configured such that the second left tire 37 contacts the left lateral ledge 116 when the second left shock absorber 112 is positioned between the second left fully compressed position and second left fully extended position.

It should be appreciated that the work machine 10 is configured to have increased stability. When the receptacle is loaded with a heavy load, such as dirt or rock, the weight of the load may cause the frame to tilt to the right in the general direction of arrow 100. In the present invention, either the first right tire 32 or the second right tire 33 will come into contact with the right lateral ledge 114 of the receptacle 42 before the first right shock absorber 106 or the second right shock absorber 108 is placed in its respective fully compressed position.

There are two advantages to such a configuration. First, the first right tire 32 or second right tire 33 provides added support to oppose further tilting of the frame 18 in the general direction of arrow 100. Second, the first right tire 32 or the second right tire 33 prevents the respective first right shock absorber 106 or second right shock absorber 110 from being positioned in the fully compressed position thereby preventing damage to the first right shock absorber 106 or the second right shock absorber 110. Damage to either of the shock absorbers 106, 110 is relatively more expensive than the potential damage to either the first right tire 32 or the second right tire 33.

Similarly, either the first left tire 35 or the second left tire 37 will come into contact with the left lateral ledge 116 of the receptacle 42 before the first left shock absorber 108 or the second left shock absorber 112 is placed in its respective fully compressed position thereby preventing potential damage to the first left shock absorber 108 or the second left shock absorber 112.

Referring again to FIG. 1, the twisting motion of the cab assembly 12 with respect to the trailer assembly 14 at the hitch 16 provides the work machine 10 with increased stability. In particular, hitch assembly 16 includes a first hitch member 118 secured to the cab assembly 12 which is rotatably engaged to a second hitch member 120 of the frame 18 of the trailer assembly 14. The hitch assembly 16 allows the cab assembly 12 to rotate relative to the trailer assembly 14 in the general direction of arrows 99 and 100. The rotating motion of the cab assembly 12 relative to the trailer assembly allows the tires 38 of the cab assembly 12 to remain in contact with the ground independently of the tires 32, 33, 35, 37 mounted on the trailer assembly 14. Maintaining all six of the tires in constant contact with the ground improves the stability and traction of the work machine 10.

Tailgate Assembly

Referring now to FIGS. 7 and 8, there is shown a rear portion of the receptacle 42. The receptacle 42 further includes a tailgate 122 extending transversely from the first lateral sidewall 44 to the second lateral sidewall 46. The tailgate 122 is pivotally coupled to the receptacle 42 near the floor 48 by a hinge joint 124. The hinge joint 124 defines a tailgate axis 126 about which the tailgate 122 rotates.

The tailgate 122 is movable between a closed position, shown in FIG. 7, and an open position, shown in FIG. 8. In the closed position, the tailgate 122 prevents loads, such as dirt and rock, from exiting the receptacle in the general direction of arrow 92. In the open position, the tailgate 122 allows loads, such as dirt and rock, to exit the receptacle 42 in the general direction of arrow 92, as shown in FIG. 8.

The first lateral sidewall 44 has a first cylinder recess 128 defined therein. A first tailgate cylinder 130 is positioned within the first cylinder recess 128. A first end 132 of the cylinder 130 is secured to the first lateral sidewall 44 of the receptacle. The first cylinder 130 is movable between a first rod position (shown in FIG. 7) and a second rod position (shown in FIG. 8). A linkage 134 couples the tailgate cylinder 130 to the tailgate 122 such that placing the tailgate cylinder 130 in the first rod position places the tailgate 122 in the closed position and placing the tailgate cylinder 130 in the second rod position places the tailgate 122 in the open position. A protective cover 136 (shown in FIG. 1) is positioned over the first cylinder recess 128 and covers the tailgate cylinder 130 and the linkage 134.

The linkage 134 includes a lever 136 pivotally attached to the first lateral sidewall at a fulcrum 138. A first lever end 140 is secured to the tailgate 122 and a second lever end 142 is secured to the tailgate cylinder 130. It should be appreciated that the fulcrum 138 of the lever 136 is aligned with the tailgate axis 126. Aligning the tailgate axis 126 with the fulcrum 138 of the lever 136 has the advantage of allowing the linear motion of the tailgate cylinder 130 to proportionately be converted into arcuate motion of the tailgate 122.

To move the tailgate 122 from the closed position, shown in FIG. 7, to the open position, shown in FIG. 8, the tailgate cylinder 130 is moved from the first rod position to the second rod position. As the tailgate cylinder 130 is moved from the first rod position to the second rod position, the second lever end 142 of the lever 136 is urged in the general direction of arrow 102, which causes the lever 136 to pivot about the fulcrum 138 in the general direction of arrow 28. As the lever 136 pivots about the fulcrum 138 in the general direction of arrow 28, the first lever end 140 urges the tailgate 122 in the general direction of arrow 28 which positions the tailgate 122 in the open position (shown in FIG. 8).

To move the tailgate 122 from the open position, shown in FIG. 8, to the closed position, shown in FIG. 7, the tailgate cylinder 130 is moved from the second rod position to the first rod position. As the tailgate cylinder 130 is moved from the second rod position to the first rod position, the second lever end 142 of the lever 136 is urged in the general direction of arrow 104, which causes the lever 136 to pivot about the fulcrum 138 in the general direction of arrow 30. As the lever 136 pivots about the fulcrum 138 in the general direction of arrow 30, the first lever end 140 urges the tailgate 122 in the general direction of arrow 30 which positions the tailgate 122 in the closed position (shown in FIG. 7).

Referring to FIG. 3, it should be appreciated that a second tailgate cylinder 150 is positioned in a second cylinder recess 148 defined in the second lateral sidewall 46 of the receptacle 42. The second tailgate cylinder 150 is operatively coupled to the tailgate 122 via a linkage 144 substantially identical to the linkage 134. It should further be appreciated that the first tailgate cylinder 130 and the second tailgate cylinder 150 operate in unison to move the tailgate 122 between the open and the closed positions.

An advantage of the present invention is that the tailgate cylinder 130 is positioned on the first lateral sidewall 44. When the tailgate 122 is in the closed position, an upper edge 146 of the tailgate 122 is positioned vertically below the tailgate cylinder 130 and vertically above the lever 136. The tailgate cylinder 130 and the lever 136 are positioned above an upper edge 146 of the tailgate 122 when the tailgate 122 is positioned in the open position. Positioning the tailgate cylinder 130 and the lever 136 above the upper edge 146 allows the upper edge 146 of the tailgate 122 to be used as a work tool to move low density material, such as lightly compacted dirt, without exposing the tailgate cylinder 130 to the low density material. Some tailgate assemblies heretofore designed place the tailgate cylinder underneath the receptacle and expose the tailgate cylinders to the environment underneath the receptacle.

Hydraulic Circuit

Figure 9:
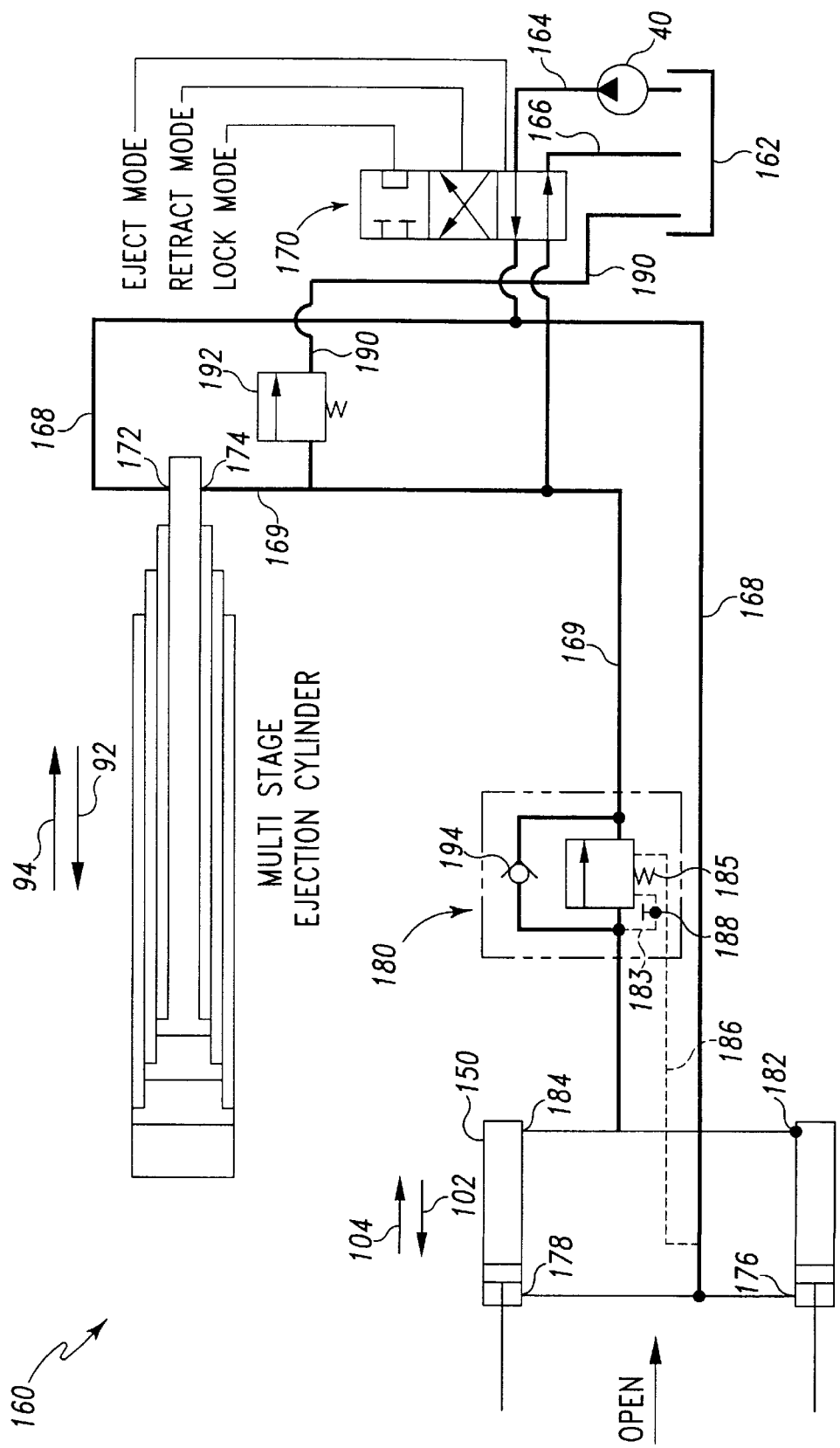
FIG. 9 is schematic view of a hydraulic circuit of the work machine of FIG. 1.

Referring now to FIG. 9, there is shown a hydraulic circuit 160. The hydraulic circuit 160 includes the hydraulic pump 40 (shown in FIG. 1) and a reservoir or sump 162. The pump 40 draws low pressure hydraulic fluid from the sump 162 and outputs high pressure hydraulic fluid to a pump outlet line 164. A sump return line 166 is in fluid communication with the sump 162. The hydraulic circuit 160 further includes a first fluid line 168 and a second fluid line 169.

A selector valve 170 is interposed between the pump outlet line 164, sump return line 162, fluid line 168, and the second fluid line 169. The selector valve 170 has three modes of operation: an eject mode, a retract mode, and a locked mode. When the selector valve 170 is operated in the first mode or eject mode (shown in FIG. 9), the first fluid line 168 is placed in fluid communication with the pump supply line 164 and the second fluid line 169 is placed in fluid communication with the sump return line 166. When the selector valve 170 is operated in the second mode or retract mode, the second fluid line 169 is placed in fluid communication with the pump supply line 164 and the first fluid line 168 is placed in fluid communication with the sump return line 166. When the selector valve is operated in the third mode or locked mode, fluid flow from the first fluid line 168 is blocked, fluid flow from the second fluid line 169 is blocked, and the pump supply line 164 is placed in fluid communication with the sump return line 166.

When the selector valve 170 is operated in the eject mode (shown in FIG. 9), high pressure fluid from the pump 40 is advanced to a first intake port 172 of the multistage cylinder 62 via the pump supply line 164 and the first fluid line 168. When the pressure in the first fluid line 168 exceeds a first pressure threshold, the multistage cylinder 62 initiates movement in the general direction of arrow 92. Excess fluid from the multistage cylinder 62 is advanced from a first exhaust port 174 of the multistage cylinder 62 to the sump 162 via the second fluid line 169 and the sump return line 166.

Concurrently to supplying high pressure fluid to the intake port 172 of the multistage cylinder 62, high pressure fluid from the pump 40 is supplied to a second intake port 176 of the first tailgate cylinder 130 and a third intake port 178 of the second tailgate cylinder 150. However, the tailgate cylinders 130, 150 do not advance in the general direction of arrow 104 because the fluid flow out of the first tailgate cylinders 130, is blocked by a locking valve 180 which prevents fluid communication between exhaust ports 182, 184 when the locking valve 180 is in a flow blocking position. Therefore, until the locking valve 180 is placed in a flow enabling position whereby the exhaust ports 182, 184 are placed in fluid communication with the sump 162, the tailgate cylinders 130,150 do not move as the multistage cylinder 62 advances in the general direction of arrow 92.

The locking valve 180 is biased into the flow blocking position (shown in FIG. 9) which prevents fluid communication between the exhaust ports 182, 184 and the sump 162. In particular, a first pilot line 183 applies the pressurized fluid from the exhaust ports 182, 184 to urge the locking valve 180 into the flow preventing position. In addition, a biasing member, such as a spring 185, urges the locking valve into the flow preventing position. An adjustable valve 188 adjusts flow from the first pilot line 183, and therefore the biasing force of the first pilot line 183 used to position the locking valve 180 in the flow blocking position. The adjustable valve 188 is located in front of the receptacle 42 on the frame 18 so as to be easily adjusted by an operator of the work machine (see FIG. 1).

A second pilot line 186 is used to overcome the combined bias force of the first pilot line 183 and the biasing member 185. In particular, the second pilot line 186 is in fluid communication with the first fluid line 168 and uses high pressure from the first fluid line 168 to overcome the combined bias of the first pilot line 183 and the biasing member 185. When the pressure in the first fluid line 168 exceeds a second pressure threshold which overcomes the combined bias of the first pilot line 183 and the biasing member 185, the locking valve 180 is placed in the flow enabling position which places the exhaust ports 182, 184 in fluid communication with the sump 162 thereby allowing the first tailgate cylinders 130, 150 to move in the general direction of arrow 104. Thus, the tailgate cylinders 130, 150 move in conjunction with the multistage cylinder 62.

Figure 10A:
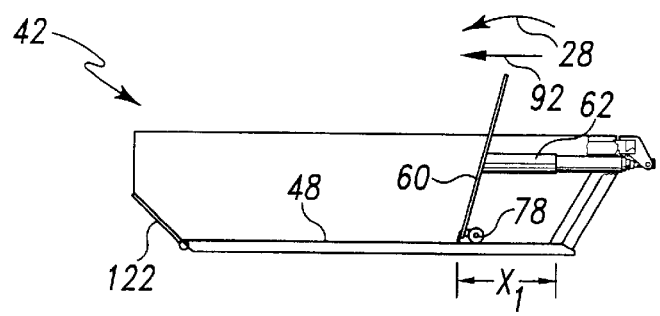
FIG. 10A is a cutaway view of the right side of the receptacle of the work machine of FIG. 1 with the ejector plate moved a distance $X_1$ from the front of the receptacle.
Figure 10B:
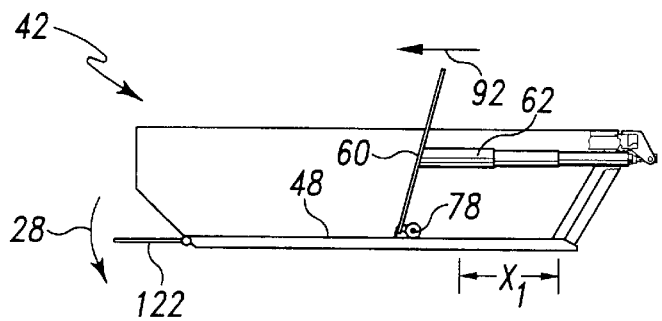
FIG. 10B is a view similar to FIG. 10A, but showing the tailgate moving in conjunction with the ejector plate.
Figure 10C:
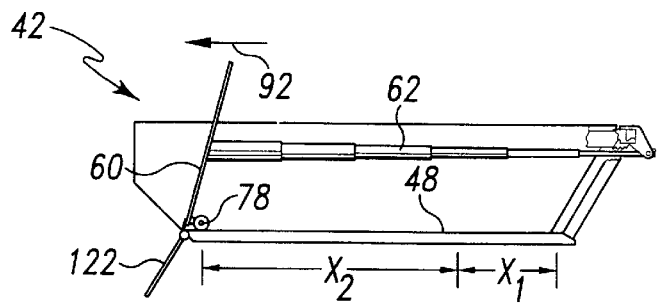
FIG. 10C is a view similar to FIG. 10B, but showing the ejector plate extended a distance $X_2$ plus $X_1$ to a fully extended position and the tailgate in the open position.

Referring now to FIGS. 10A, 10B, and 10C, it should be appreciated that adjusting the adjustable valve 88 determines when the tailgate cylinders 130, 150 begin to move the tailgate 122 in relation to the movement of the ejector plate 60. It has been found that it is advantageous to keep the tailgate 122 in the closed position until the first stage of the multistage cylinder 62 is extended. The adjustable valve 188 is adjusted so that the locking valve 180 is not placed in the flow enabling position until the multistage cylinder 62 has extended its first stage as shown in FIG. 10A. This is done by adjusting the valve such that the second pressure threshold occurs at the pressure at which the first stage of the multistage cylinder 62 is extended.

When pressurized fluid is applied to the first fluid line 168, the multistage cylinder 62 moves a first distance $X_1$ by extending the first stage of the multistage cylinder (shown in FIG. 10A) prior to the opening of the tailgate 122. As the multistage cylinder 62 is being extended the distance of $X_1$, the locking valve 180 prevents the tailgate cylinders 130, 150 from moving. Once the pressure in the first fluid line 168 exceeds the second pressure threshold, the locking valve 180 is placed in the flow enabling position and the multistage cylinder 62 and the tailgate cylinders 130, 150 move simultaneously (see FIG. 10B). The multistage cylinder 62 and the tailgate cylinders 130, 150 move together for a second distance $X_2$ until the ejector plate 60 is positioned in the fully extended position and the tailgate 122 is positioned in the open position (shown in FIG. 10C).

The point $X_1$ can be adjusted with the adjustable valve 188. If it is desired to delay placing the locking valve 180 in the flow enabling position, the adjustable valve 188 can be adjusted to admit a greater flow of pressurized fluid from the first pilot line 183 to the locking valve 180 thereby increasing the second pressure threshold required to move the locking valve 180 from the flow blocking position to the flow enabling position. By increasing the second pressure threshold, the point $X_1$ at which the tailgate cylinders 130, 150 begin to move is shifted in the general direction of arrow 92 shown in FIG. 10A. On the other hand, if it is desired to advance placing of the locking valve 180 in the flow enabling position, the adjustable valve 188 can be adjusted to admit a lesser flow of pressurized fluid from the first pilot line 182 to the locking valve 180 thereby decreasing the second pressure threshold required to move the locking valve 180 from the flow preventing to the flow enabling position. By decreasing the second pressure threshold, the point $X_1$ at which the tailgate cylinders 130, 150 begin to move is shifted to the right of the position shown in FIG. 10A.

When the selector valve 170 is operated in the retract mode, high pressure fluid from the pump 40 is advanced to a first exhaust port 174 of the multistage cylinder 62 via the pump supply line 164 and the second fluid line 169 so as to advance in the general direction of arrow 94. Excess fluid from the multistage cylinder 62 is advanced from a first exhaust port 174 of the multistage cylinder 62 to the sump 162 via the second fluid line 169, selector valve 170, and the sump return line 166.

However, because of the large volume of hydraulic fluid in the multistage cylinder 62 it takes a long time to drain the hydraulic fluid through the selector valve 170. To increase the flow of hydraulic fluid from the multistage cylinder 62 to the sump 162, a bypass line 190 places the second fluid line 168 in fluid communication with the sump 162. A bypass valve 192 allows fluid flow from the second fluid line 169 to the sump 162 when the bypass valve is placed in a flow enabling position, and prevents fluid flow between the second fluid line 169 and the sump 162 when the bypass valve is in the flow enabling position. When the selector valve 170 is operated in the flow retract mode, the bypass valve 192 is placed in the flow enabling position to allow hydraulic fluid to flow from the second fluid line 169 to the sump 162 via the bypass line 190.

Concurrently to supplying high pressure fluid to exhaust port 174 of the multistage cylinder 62, high pressure fluid from the pump 40 is supplied to the second exhaust port 182 of the first tailgate cylinder 130 and the third exhaust port 184 of the second tailgate cylinder 150. In particular, pressurized hydraulic fluid bypasses the locking valve 180 via a check valve 194 which permits flow from the second fluid line 169 to the tailgate cylinders 130, 150. Thus, the high pressure fluid in the second fluid line 169 urges the multistage cylinder 62 and the tailgate cylinders 130, 150 to move simultaneously (see FIG. 10D). The multistage cylinder 62 and the tailgate cylinders 130, 150 move together until the ejector plate 60 is positioned in the fully retracted position and the tailgate 122 is positioned in the closed position (shown in FIG. 2).

Figure 10D:
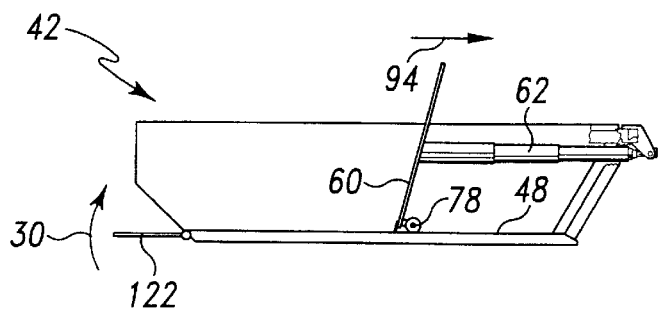
FIG. 10D is a view similar to FIG. 10C but showing the tailgate moving in conjunction with the ejector plate from the extended position to the retracted position.

It should be appreciated that the hydraulic circuit 160 can be operated during a first cycle (shown in FIGS. 10A–D) in which the ejector plate 160 moves the first distance $X_1$ without moving the tailgate 122 (see FIG. 10A), and moves the second distance $X_2$ where the ejector plate 160 moves in conjunction with the tailgate 122 (see FIGS. 10C and 10D). It should also be appreciated that by adjusting the adjustable valve 188 prior to a second cycle (not shown), the point at which the ejector plate 160 moves without moving the tailgate 122 can be adjusted to occur when the tailgate 122 is at a third distance during the second cycle. The third distance is greater than the first distance if the adjustment to the adjustable valve 188 increases the second pressure threshold and the third distance being less than the first distance if the adjustment to the adjustable valve 188 decreases the second pressure threshold. Thereafter during the second cycle, the ejector plate 160 and the tailgate 122 move in conjunction a fourth distance until the ejector plate 160 is in the fully extended position and the tailgate 122 is in the open position.

When the selector valve 170 is operated in the locked mode, excess fluid from the multistage cylinder 62 is prevented from advancing from the first intake port 172 or the first exhaust port 174 to the sump 162, thereby preventing movement of the multistage cylinder 62 in the general direction of arrows 92 or 94. It should be appreciated that preventing movement of the multistage cylinder 62 prevents movement of the ejector plate 60. Similarly, excess fluid from the tailgate cylinders 130, 150 is prevented from advancing from the intake ports 176, 178 or the exhaust ports 182, 184 to the sump 162, thereby preventing movement of the tailgate cylinders 130, 150 in the general direction of arrows 102 or 104. It should further be appreciated that preventing movement of the tailgate cylinders 130, 150 prevents movement of the tailgate 122.

INDUSTRIAL APPLICABILITY

Referring to FIG. 1, when the receptacle 42 of the work machine 10 is filled with a load, such as dirt or rock, the load can be ejected rearwardly in the general direction of arrow 92. Power from the engine 34 is used to drive a hydraulic pump 40 which provides the motive force to eject the load.

Referring now to FIG. 9, when the selector valve 170 is operated in the eject mode of operation, pressurized fluid from the pump 40 is supplied to the first intake port 172 of the multistage cylinder 62. Supplying pressurized fluid to the first intake port 172 causes the multistage hydraulic cylinder to extend in the general direction of arrow 92.

Referring now to FIG. 2, when the ejector plate is in the fully retracted position (shown in solid), the ejector plate 60 is supported by the support roller 78 on the floor 48. The ejector plate 60 is further supported by the first trailing roller 68 acting on the first lower rail surface 52 of the first rail 50. In a similar fashion, the ejector plate 160 is supported by the second trailing roller 73 acting on the second lower rail surface 56 of the second rail 54 (see FIG. 3).

As the ejector plate 60 moves in the general direction of arrow 92, the ejector plate 60 rotates in the general direction of arrow 28 about the support roller 78. Rotation of the ejector plate 60 in the general direction of arrow 28 moves the first trailing roller 68 out of contact with the first rail 50 and moves the first leading roller 66 into contact with the first lower surface 52 of the first rail 50. In a similar fashion, the second trailing roller 73 is moved out of contact with the second rail 54 and the second leading roller 72 is moved into contact with the second lower surface 54 of the second rail 56. In addition, the rotation of the ejector plate 60 in the general direction of arrow 28 decreases the gap between the lower portion 82 of the ejector plate 60 and the floor 48 from a distance $D_1$ (shown in FIG. 2A) to distance $D_2$ (shown in FIG. 2B). By decreasing the gap to a distance D1, the lower portion 82 of the ejector plate can scrape excess material from the floor 48 of the receptacle 42 as the ejector plate moves in the general direction of arrow 92. The distances D1 and D2 can be adjusted by rotating the adjustable cam 80.

The ejector plate 60 moves in the general direction 92 while the tailgate remains in the closed position until the pressure in the first fluid line 168 exceeds the second pressure threshold and the ejector plate 60 is moved a first distance $X_1$ (shown in FIG. 10A) In the present invention, it is preferred that the distance $X_1$ be equal to the distance that the ejector plate 160 is at when the first stage of the multistage cylinder 62 is fully extended. When the pressure in the first fluid line 168 exceeds the first pressure threshold, the locking valve 180 is moved from the flow blocking position to the flow enabling position which places the exhaust ports 182, 184 in fluid communication with the sump 162. Placing the exhaust ports 182, 184 in fluid communication with the sump 162 allows the tailgate cylinders 130,150 to move in the general direction of arrow 104.

Thereafter, the multistage cylinder 62 continues to move the ejector plate 60 in the general direction of arrow 92 as the tailgate cylinders 130, 150 move the tailgate from the closed position (shown in FIG. 7) to the open position (shown in FIG. 8). In particular, as the fist tailgate cylinder 130 moves from the first rod position (shown in FIG. 8), to the second rod position (shown in FIG. 9) the linkage 134 urges the tailgate 122 to rotate about the tailgate axis 126 in the general direction of arrow 28 until the tailgate is positioned in the open position. It should be appreciated that when the tailgate 122 is positioned in the open position, the tailgate may be used as a work tool to move objects below the receptacle 42. Using the tailgate as a work took does not expose the side mounted tailgate cylinders 130,150 to damage from the objects being moved.

Referring again to FIG. 9, when the selector valve 170 is operated in the retract mode of operation, pressurized fluid is advanced from the pump 40 to the first exhaust port 174 of the multistage cylinder 62. Supplying pressurized fluid to the first exhaust port 174 causes the multistage hydraulic cylinder 62 to retract in the general direction of arrow 94.

Referring now to FIG. 3, when the ejector plate 60 is in the extended position (shown in solid), the ejector plate 60 is supported by the support roller 78 on the floor 48. The ejector plate 160 is further supported by the second leading roller 72 acting on the second lower rail surface 56 of the second rail 54. In a similar fashion, the ejector plate 60 is supported by the first leading roller 66 acting on the first lower rail surface 52 of the first rail 50 (see FIG. 2).

As the ejector plate 60 moves in the general direction of arrow 94, the ejector plate 60 rotates in the general direction of arrow 30 about the support roller 78. Rotation of the ejector plate 60 in the general direction of arrow 30 moves the second leading roller 72 out of contact with the second rail 54 and moves the second trailing roller 73 into contact with the second lower surface 56 of the second rail 50. In a similar fashion, the first leading 66 is moved out of contact with the first rail 50 and the first trailing roller 68 is moved into contact with the first lower surface 52 of the first rail 50. In addition, the rotation of the ejector plate 60 in the general direction of arrow 30 increases the gap between the lower portion 82 of the ejector plate 60 and the floor 48 from a distance $D_2$ (shown in FIG. 3A) to distance $D_1$ (shown in FIG. 3B). By increasing the gap to a distance D2, the lower portion 82 of the ejector plate 60 is provided with extra clearance from the floor 82 as the ejector plate 60 moves in the general direction of arrow 94 making it less likely that the lower portion 82 of the ejector plate 60 will become stuck as the ejector plate 60 is retracted in the general direction of arrow 94.

Concurrently with the ejector plate 60 moving in the general direction 94, the tailgate 122 begins to move from the open position to the closed position. In particular, a check valve 194 (shown in FIG. 9) allows pressurized fluid to bypass the locking valve 180 and flow directly to the exhaust ports 182, 184 thereby moving the tailgate 122 from the open position to the closed position.

Additionally, while the selector valve 170 is operating in the retract mode, the bypass valve 192 is opened so as to place the second fluid line 169 in fluid communication with the sump 162 via the bypass line 190. It should be appreciated that the placing the bypass line 190 and the sump return line 166 in fluid communication with the sump 162 allows hydraulic fluid in the multistage cylinder 62 to flow to the sump 162 at an accelerated rate.

Referring now to FIGS. 4, 5, and 6, the present invention also provides the work machine 10 with increased stability. As the frame 18 of the work machine 10 tilts to the right in the general direction of arrow 100, the first right tire 32 or the second right tire 33 comes into contact with the right lateral ledge 114 prior to placing either the first right shock absorber 106 or the second right shock absorber 100 in the fully compressed position. When the first right tire 32 or second right tire 33 contacts the right lateral ledge 114, the tire provides additional support to oppose further tilting of the frame 18 in the direction of arrow 100. In addition, the first right tire 32 or second right tire 33 prevents the respective first right shock absorber 106 or second right shock absorber 110 from being positioned in the fully compressed position thereby preventing expensive damage to the first right shock absorber 106 or the second right shock absorber 110. Additionally, as the frame 18 of the work machine 10 tilts to the right in the general direction of arrow 99, the first left tire 35 or the second left tire 37 comes into contact with the left lateral ledge 116 prior to placing either the first left shock absorber 108 or the second left shock absorber 112 in the fully compressed position.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A work machine, comprising:
    a receptacle adapted to receive and carry loads having a first lateral sidewall, a second lateral sidewall spaced apart from said first lateral sidewall, and a floor extending between said first lateral sidewall and said second lateral sidewall, wherein said first lateral sidewall has a first cylinder recess defined therein;
    a tailgate which extends transversely from said first sidewall to said second sidewall, said tailgate being movable between (i) a closed position which prevents loads from exiting a rear portion of said receptacle, and (ii) an open position which allows loads to exit said rear portion of said receptacle;
    a cylinder positioned within said first cylinder recess and movable between a first rod position and a second rod position;
    a linkage positioned within said first cylinder recess, wherein said linkage (i) operatively couples said cylinder to said tailgate, (ii) positions said tailgate in said closed position when said cylinder is in said first rod position, and (iii) positions said tailgate in said open position when said cylinder is in said second rod position; and
    a protective cover positioned over said first cylinder recess and secured to said first lateral sidewall;
    wherein said cylinder is in a retracted condition when said cylinder is located in said second rod position.

2. The work machine of claim 1, wherein said cylinder is positioned at a height vertically above said tailgate.

3. The work machine of claim 1, wherein:
    said tailgate has an upper edge, and
    said linkage positions said upper edge of said tailgate at a height vertically below both said linkage and said cylinder when said tailgate is positioned in said open position.

4. The work machine of claim 3, wherein said linkage positions said upper edge of said tailgate at a height vertically above said linkage when said tailgate is positioned in said closed position.

5. The work machine of claim 1, further comprising an ejector plate positioned within said receptacle and extending transversely between said first lateral sidewall and said second lateral sidewall, said ejector plate being movable between a retracted position and an extended position, wherein:
    said tailgate is located in said closed position when said ejector plate is located in said retracted position, and
    said tailgate is located in said open position when said ejector plate is located in said extended position.

6. A work machine, comprising:
    a receptacle adapted to receive and carry loads having a first lateral sidewall, a second lateral sidewall spaced apart from said first lateral sidewall, and a floor extending between said first lateral sidewall and said second lateral sidewall;
    a tailgate which extends transversely from said first lateral sidewall to said second lateral sidewall, said tailgate being pivotable between (i) a closed position which prevents loads from exiting a rear portion of said receptacle, and (ii) an open position which allows loads to exit said rear portion of said receptacle;
    a cylinder movable between a first rod position and a second rod position; and
    a linkage which positions said tailgate in said closed position when said cylinder is located in said first rod position, and positions said tailgate in said open position when said cylinder is located in said second rod position, wherein (i) said linkage includes a lever having a first lever end, a second lever end, and a fulcrum positioned between said first lever end and said second lever end, (ii) said lever is pivotally coupled to said first lateral sidewall, (iii) said first lever end is coupled to said tailgate, and (iv) said second lever end is coupled to said cylinder;
    wherein said cylinder is in a retracted condition when said cylinder is located in said second rod position.

7. The work machine of claim 6, wherein said cylinder is positioned at a height vertically above said tailgate.

8. The work machine of claim 6, wherein:
    said tailgate has an upper edge, and
    said lever positions said upper edge of said tailgate at a height vertically below both said lever and said cylinder when said tailgate is positioned in said open position.

9. The work machine of claim 8, wherein said lever positions said upper edge of said tailgate at a height vertically above said lever when said tailgate is positioned in said closed position.

10. The work machine of claim 6, further comprising an ejector plate positioned within said receptacle and extending transversely between said first lateral sidewall and said second lateral sidewall, said ejector plate being movable between a retracted position and an extended position, wherein:
    said tailgate is located in said closed position when said ejector plate is located in said retracted position, and said tailgate is located in said open position when said ejector plate is located in said extended position.

11. A work machine, comprising:

a receptacle adapted to receive and carry loads having a first lateral sidewall having a cylinder recess defined therein, a second lateral sidewall spaced apart from said first lateral sidewall, and a floor extending between said first lateral sidewall and said second lateral sidewall;

a tailgate which extends transversely from said first lateral sidewall to said second lateral sidewall, said tailgate being pivotable around a tailgate axis between (i) a closed position which prevents loads from exiting a rear portion of said receptacle, and (ii) an open position which allows loads to exit said rear portion of said receptacle;

a cylinder positioned within said first cylinder recess and movable between a first rod position and a second rod position;

a protective cover positioned over said first cylinder recess; and a lever which positions said tailgate in said closed position when said cylinder is located in said first rod position, and positions said tailgate in said open position when said cylinder is located in said second rod position, wherein (i) said lever has a first lever end, a second lever end, and a fulcrum positioned between said first lever end and said second lever end, (ii) said lever is pivotally coupled to said first lateral sidewall, (iii) said first lever end is coupled to said tailgate, (iv) said second lever end is coupled to said cylinder, and (v) said fulcrum is aligned with said tailgate axis;

wherein said cylinder is in a retracted condition when said cylinder is located in said second rod position.

12. The work machine of claim 11, wherein said cylinder is positioned at a height vertically above said tailgate axis.

13. The work machine of claim 11, wherein:

said tailgate has an upper edge, and said lever positions said upper edge of said tailgate at a height vertically below both said lever and said cylinder when said tailgate is positioned in said open position.

14. The work machine of claim 13, wherein said lever positions said upper edge of said tailgate at a height vertically above said lever when said tailgate is positioned in said closed position.

15. The work machine of claim 11, further comprising an ejector plate positioned within said receptacle and extending transversely between said first lateral sidewall and said second lateral sidewall, said ejector plate being movable between a retracted position and an extended position, wherein:

said tailgate is located in said closed position when said ejector plate is located in said retracted position, and said tailgate is located in said open position when said ejector plate is located in said extended position.

* * * * *